US008997173B2

(12) United States Patent
Fadida et al.

(10) Patent No.: US 8,997,173 B2
(45) Date of Patent: Mar. 31, 2015

(54) MANAGING SECURITY CLUSTERS IN CLOUD COMPUTING ENVIRONMENTS USING AUTONOMOUS SECURITY RISK NEGOTIATION AGENTS

(75) Inventors: Itzhak Fadida, Silver (IL); Nir Barak, Yosef (IL); Eitan Hadar, Nesher (IL)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 13/611,519

(22) Filed: Sep. 12, 2012

(65) Prior Publication Data

US 2014/0075494 A1    Mar. 13, 2014

(51) Int. Cl.
*G06F 21/00* (2013.01)
*G06F 9/455* (2006.01)
*G06F 21/53* (2013.01)

(52) U.S. Cl.
CPC ............ *G06F 9/45558* (2013.01); *G06F 21/53* (2013.01); *G06F 2009/45587* (2013.01)
USPC .......................................................... 726/1

(58) Field of Classification Search
USPC ............................................................ 726/1
See application file for complete search history.

(56) References Cited

U.S. PATENT DOCUMENTS

| | | | |
|---|---|---|---|
| 2010/0217850 A1* | 8/2010 | Ferris | 709/223 |
| 2011/0072487 A1 | 3/2011 | Hadar et al. | |
| 2011/0265076 A1 | 10/2011 | Thorat et al. | |

* cited by examiner

*Primary Examiner* — Minh Dinh
*Assistant Examiner* — Devin Almeida
(74) *Attorney, Agent, or Firm* — Myers Bigel Sibley & Sajovec, P.A.

(57) ABSTRACT

A method includes receiving at a similarity arbitrator information about a security policy of a candidate virtual machine that is proposed to be included in a cluster of virtual machines, comparing the security policy of the candidate virtual machine to the security policies of a plurality of virtual machines in the cluster, and in response to the comparison, recommending that a virtualization environment manager exclude the candidate virtual machine from the cluster or include the candidate virtual machine in the cluster. Related systems and computer program products are also disclosed.

16 Claims, 5 Drawing Sheets

MANAGING SECURITY CLUSTERS IN CLOUD COMPUTING ENVIRONMENTS USING AUTONOMOUS SECURITY RISK NEGOTIATION AGENTS

BACKGROUND

The present disclosure relates to computing systems, and in particular to maintaining the security of computing systems in virtual operating environments.

Virtualized computing environments, also referred to as cloud computing systems, are used to provide computing resources to end users. In a cloud computing environment, the physical hardware configuration is hidden from the end user. Cloud computing systems may include servers, network storage devices, routers, gateways, communication links, and other devices. However, because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines, which are isolated guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

Because cloud computing treats computing resources as remote services that are accessed by customers, and because the actual physical resources that are used to implement a cloud computing environment may be accessed by many different customers, security is an important aspect of cloud computing.

Many different technologies have been developed to prevent security breaches in computing systems. For example, the physical security of computing systems can be addressed by locating the computing systems in a secure facility. Communication links can be encrypted or secured to prevent eavesdropping on communications with computing resources. Application programs and databases can be secured using authentication protocols to prevent unauthorized access.

Many security systems and procedures have an overhead cost associated with their use. For example, encrypting and decrypting communications requires time and computing resources, particularly for high volume communications. A system designer must therefore make a tradeoff between the level of security required for the system and the amount of overhead expense that can be tolerated. Depending on the sensitivity of the application, computing systems can be provided with varying levels of security.

In a cloud computing environment, different customers may have different security requirements. Hosting applications that have different security requirements in a single cloud computing system may raise additional security issues, however. For example, when highly secured systems are hosted along with lower security systems, an attacker may attempt to leverage the lower security system to gain access to the highly secured systems.

BRIEF SUMMARY

A server system according to some embodiments includes a plurality of virtual machines that are managed as a cluster of virtual machines by a virtualization environment manager. At least one of the virtual machines in the cluster includes a similarity arbitrator that is configured to receive data about a security policy of a candidate virtual machine that is proposed to be included in the cluster or excluded from the cluster, to compare the security policy of the candidate virtual machine to security policies of a plurality of virtual machines in the cluster, and in response to the comparison, to generate a recommendation that the virtualization environment manager exclude the candidate virtual machine from the cluster or include the candidate virtual machine in the cluster.

The similarity arbitrator may include a policy codification component that is configured to codify the security policy of the candidate virtual machine.

The candidate virtual machine may include a virtual machine that is proposed to be added to the cluster or a virtual machine in the cluster having a security policy that has changed.

The similarity arbitrator may be configured to generate a metric that compares the security policy of the candidate virtual machine to the security policies of each of the virtual machines in the cluster.

The similarity arbitrator may be configured to recommend excluding the candidate virtual machine from the cluster if the security policy of the candidate virtual machine differs from the security policies of the plurality of virtual machines in the cluster by an average amount that is greater than a predefined threshold amount.

In some embodiments, the similarity arbitrator may be configured to recommend excluding the candidate virtual machine from the cluster if the security policy of the candidate virtual machine differs from the security policies of any of the plurality of virtual machines in the cluster by an amount that is greater than a predefined threshold amount.

The metric that indicates a difference between a first security policy and a second security policy may be based on at least one of (i) a number of identical entries in the first and second security policies (ii) a difference in the sizes of the first and second security policies, and (iii) a difference in order of appearance of entries in the first and second security policies.

The policy codification component may be configured to generate a codified security policy by substitution of symbols for semantic terms in the security policy.

Some embodiments provide methods of operating a virtual computing system including a plurality of virtual machines that are logically arranged in a cluster that is managed by a virtualization environment manager. The methods include receiving at a similarity arbitrator data about a security policy of a candidate virtual machine that is proposed to be included in the cluster or excluded from the cluster, comparing the security policy of the candidate virtual machine to security policies of a plurality of virtual machines in the cluster, and in response to the comparison, generating a recommendation that the virtualization environment manager exclude the candidate virtual machine from the cluster or include the candidate virtual machine in the cluster.

The methods may further include codifying the security policy of the candidate virtual machine, and comparing the security policy of the candidate virtual machine to the security policies of the plurality of virtual machines in the cluster may include comparing codified versions of the security policy of the candidate virtual machine and the security policies of the plurality of virtual machines in the cluster.

Comparing the security policy of the candidate virtual machine to the security policies of the plurality of virtual machines in the cluster may include generating a metric that compares the security policy of the candidate virtual machine to the security policies of each of the plurality of virtual machines in the cluster.

The methods may further include recommending that the virtualization environment manager exclude the candidate virtual machine from the cluster if the security policy of the candidate virtual machine differs from the security policies of the plurality of virtual machines in the cluster by an average amount that is greater than a predefined threshold amount.

In some embodiments, the methods may include recommending that the virtualization environment manager exclude the candidate virtual machine from the cluster if the security policy of the candidate virtual machine differs from the security policy of any of the plurality of virtual machines in the cluster by an amount that is greater than a predefined threshold amount.

Codifying the security policy may include substituting symbols for semantic terms in the security policy.

Some embodiments provide a computer program product for operating a virtual computing system including a plurality of virtual machines that are logically arranged in a cluster that is managed by a virtualization environment manager, in which at least one of the virtual machines in the cluster includes a similarity arbitrator. The computer program product includes a computer readable storage medium having computer readable program code embodied in the medium. The computer readable program code includes computer readable program code configured to receive, at the similarity arbitrator, data about a security policy of a candidate virtual machine that is proposed to be included in the cluster or excluded from the cluster, computer readable program code configured to perform a comparison of the security policy of the candidate virtual machine to security policies of a plurality of virtual machines in the cluster, and computer readable program code configured to generate a recommendation that the virtualization environment manager include the candidate virtual machine in the cluster or exclude the candidate virtual machine from the cluster in response to the comparison of the security policy of the candidate virtual machine to the security policies of the plurality of virtual machines in the cluster.

It is noted that aspects of the inventive concepts described with respect to one embodiment may be incorporated in a different embodiments although not specifically described relative thereto. That is, all embodiments and/or features of any embodiments can be combined in any way and/or combination. These and other objects and/or aspects of the present inventive concepts are explained in detail in the specification set forth below.

Other systems, methods, and/or computer program products will be or become apparent to one with skill in the art upon review of the following drawings and detailed description. It is intended that all such additional systems, methods, and/or computer program products be included within this description, be within the scope of the present disclosure, and be protected by the accompanying claims.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
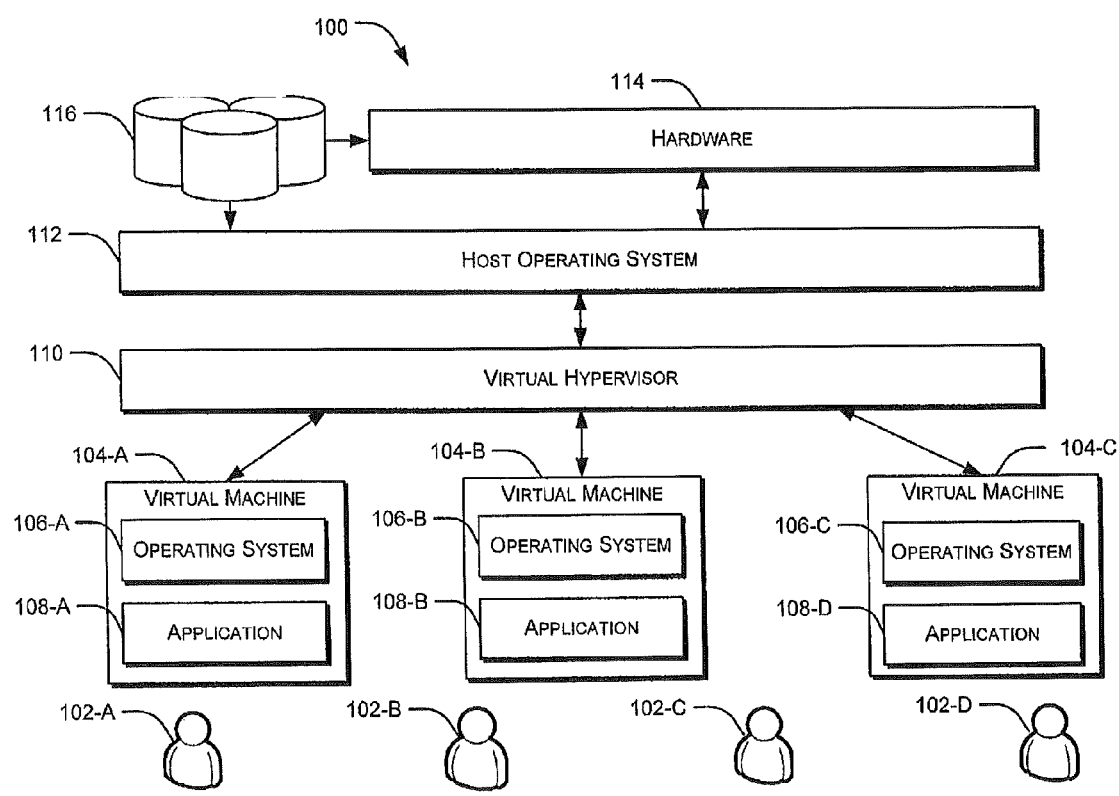
FIG. 1 is a block diagram of a computing system that supports a virtual operating environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 illustrates an exemplary server system 100 for a virtualized computing environment in which the subject matter of the present disclosure can function. The server system 100 generally hosts one or more virtual machines 104 (hereafter virtual machine 104), each of which runs a guest operating system 106 and application 108. The computing needs of users 102 drive the functionality of the virtual machines 104. A virtual hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), handheld computer, mobile computing platform, server, or any other appropriate computer hardware. The hardware platform 114 may include computing resources such as a central processing unit (CPU); networking controllers; communication controllers; a display unit; a program and data storage device; memory controllers; input devices (such as a keyboard, a mouse, etc.) and output devices such as printers. The CPU may be any conventional processor, such as the AMD Athlon™ 64, or Intel® Core™ Duo.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users 102 and is responsible for the management and coordination of activities and the sharing of the computing resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 creates an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machine 104 and the hardware platform 114 through the host operating system 112. The virtual hypervisor 110 virtualizes the computing system resources and facilitates the operation of the virtual machines 104. The hypervisor 110 may provide the illusion of operating at the highest priority level to the guest operating system 106. In fact, the virtual hypervisor 110 merely maps the guest operating system's priority level to a priority level lower than the top most priority level. As a result, the virtual hypervisor 110 can intercept the guest operating system 106, executing instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 are also performed by the virtual hypervisor 110.

Virtual machines 104 present a virtualized environment to guest operating systems 106, which in turn provide an operating environment for applications 108 and other software constructs.

Figure 2:
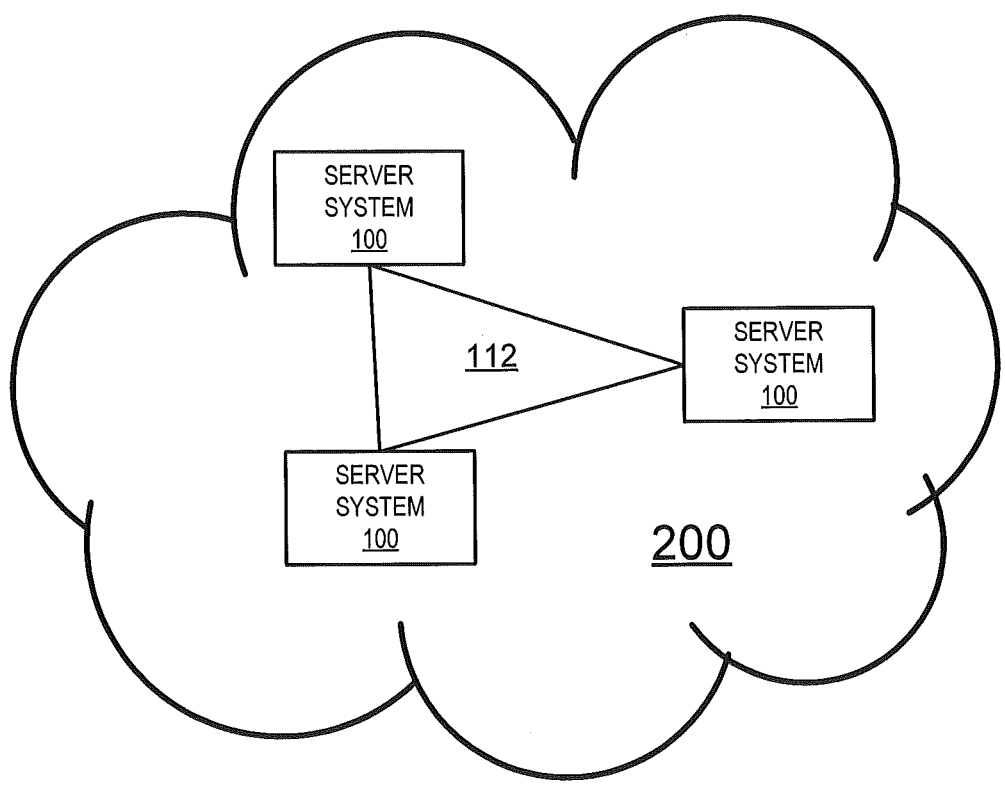
FIG. 2 illustrates a cloud computing environment.

Referring to FIG. 2, a virtualized computing environment 200 (referred to generally as cloud 200) may include one or more server systems 100 that may include one or more electronic computing devices operable to receive, transmit, process, and store data. For example, the servers in the cloud 200 may include one or more general-purpose PCs, Macintoshes, workstations, Unix-based computers, server computers, one or more server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems", it will be appreciated that any suitable computing device may be used.

To increase security in a cloud computing environment, virtual machines having similar security levels (e.g., similar security policies of risks and levels of security sensitivity) may be grouped into clusters that can be managed as a group. By grouping systems with similar security levels in a single cluster, the security of the virtual machines within the cluster may be managed more effectively and/or efficiently. Moreover, it may be undesirable to group a system having weak security policies together with systems having strong security policies, as the weakest link in a chain is commonly the point of entry of choice by an attacker.

It is further possible to weight security sensitivities, risks and policies of systems. By weighting security sensitivities and policies of systems, they can be efficiently compared and evaluated to find similarities between them, thereby indicating similar security risks and mitigation approaches (e.g., security access rules).

Security policies are used to define security rules that supervisory agents, such as hypervisors, can use to manage devices in a distributed computing environment. Such policies usually include a plurality of entries that define rules for what actions can be taken on defined target devices, and the authorized groups who can take those actions.

Rules in a security policy can be similar to one another if the nature of the restriction is the same. For example, two different rules can apply to the same command, but can have different parameters. Accordingly, a policy structure may be large, with repeating or similar rules, and may be very cumbersome to use in analytical tools.

A codified structure of security policy rules can be generated from a rule-based security policy. A codified structure can replace a security rules definition with a unique ID, parameters, occurrences, and location of the rules, which jointly define what is referred to herein as the "policy DNA."

Generation of the policy DNA for a security policy may be performed as follows. First, dedicated symbols, such as numbers, may be substituted for policy terms. A policy DNA generation tool can process a security policy and replace security policy terms with dedicated numbers (i.e. semantic substitution). As such, the codified structure can bind many semantically different rules that are created in different languages. For example, assuming a security policy definition language uses the term "allow access group machine1."This term can be replaced with a string, such as "1-2-4".

A semantic dictionary may be added to the policy header to define semantic rules used in generating the policy DNA. In particular embodiments, the portion of the dictionary that was codified in the substitution (dictionary of the number to strings/DSL replacement from the original language it was created in), may be added as a part of the DNA policy structure in XML format for usage by any potential interpreter engine. Example: <Allow access>1</Allow access><group>2<group><machine1>4<machine1>

For the codified policy rules, the occurrences of identical codified numbers may be counted, and the codified data may be de-duplicated using conventional data de-duplication techniques. Moreover, a count of the number of duplicate entries ("-CX") may be added. Example: "1-2-4-C1", "1-2-5-C2", "2-4-9-C1".

In some embodiments, the relative occurrence of codified rules may be determined so that a distribution of codified rules can be provided. For example, if a rule codified as 1-2-4 accounts for 25% of the entries in the policy DNA, a rule codified as 1-2-5 accounts for 50% of the entries in the policy DNA, and a rule codified as 2-4-9 accounts for 25% of the entries in the policy DNA, the following entries may be made in the policy DNA: "1-2-4-W25", "1-2-5-W50", "2-4-9-W25".

The codified policy may be sorted according to the stochastic distribution appearances (high count is first). Using the previous example, entries could be sorted in order as "1-2-5-W50", "1-2-4-W25", "2-4-9-W25".

A data structure, such as a unified long jagged array structure of the rules, may be created that forms the codified policy DNA, in order to reduce space. As will be understood by those skilled in the art, a jagged array is an array whose elements are themselves arrays.

A level of similarity between different policies may be calculated as follows.

Two codified jagged arrays may be compared in terms of:

[a] Content similarity (how many rows are identical, in percentage). Example: 8 out of 16 rows is 50%.

[b] Difference in the size of array. Example: 20 rows.

[c] Order of appearances of rows of the jagged structure—what is the largest distance from identical rows, in the 2 different strings. Example: 3.

One or more of these metrics may be used to compare similarity between two policies. For example, two perfectly identical policies (e.g. cloned polices) will have a metric of 100=100-0-0, indicating 100 percent identical rows, zero difference in size and zero distance between identical rows.

As another example, the difference between a full policy and an empty policy will be equal to 0-size of full policy1—size of full policy1.

The resulting number is referred to herein as the target function of the dual comparison.

The weighting and comparison of security policies can be controlled by a centralized comparison server which recommends where and how to implement and group particular virtual machines. A centralized comparison server may be used for overall planning of an entire virtualization environment, and/or for verification of the impact of a proposed change in the deployment of systems on the security state of existing virtual machines, as well as assisting in modifying the states and locations of the virtual machines.

Such an approach may be exhaustive in terms of its ability to manage the overall structure and balance of a virtual operating environment. However, because cloud computing systems are typically extremely large, such an approach may not be well suited for handling short term dynamic changes to a system. In particular, managing security based deployment changes by a centralized comparison server may be more appropriate for systems in which changes to the system, although dynamic in nature, do not occur by the minute, but rather occur on timescales of hours and/or days.

In particular, the approach of using a centralized comparison server for managing virtual machine deployment based on security policies may not be very agile in cases where rapid, frequent changes occur, such as an auction/commerce arena that has capacity peaks, or military combat arena of entering and exiting of systems that are part of a larger computation effort, etc. Such an approach may also be unsuited for environments in which not all the provisioned servers/virtual machines are controlled from a single automation tool, or when local changes of policy (e.g., sporadic policy adjustments) occur due to the tuning of a specific machine.

Local changes in security policies may trigger a relatively slow, computation-intensive centralized optimization process designed to balance/optimize the entire virtualized environment. However, the inventors of the present subject matter have recognized that it may not be necessary to re-optimize the entire virtualization requirement in response to local security policy changes. In such cases, a local examination of the changed environment in the near proximity/vicinity of the changed system can be performed and can indicate/recommend to the centralized system if any action should be considered in response to the change.

Some embodiments provide an event-stochastic driven system that can determine if a proactive change to a virtualization system should occur in response to a change in a security policy of a virtual machine.

Figure 3:
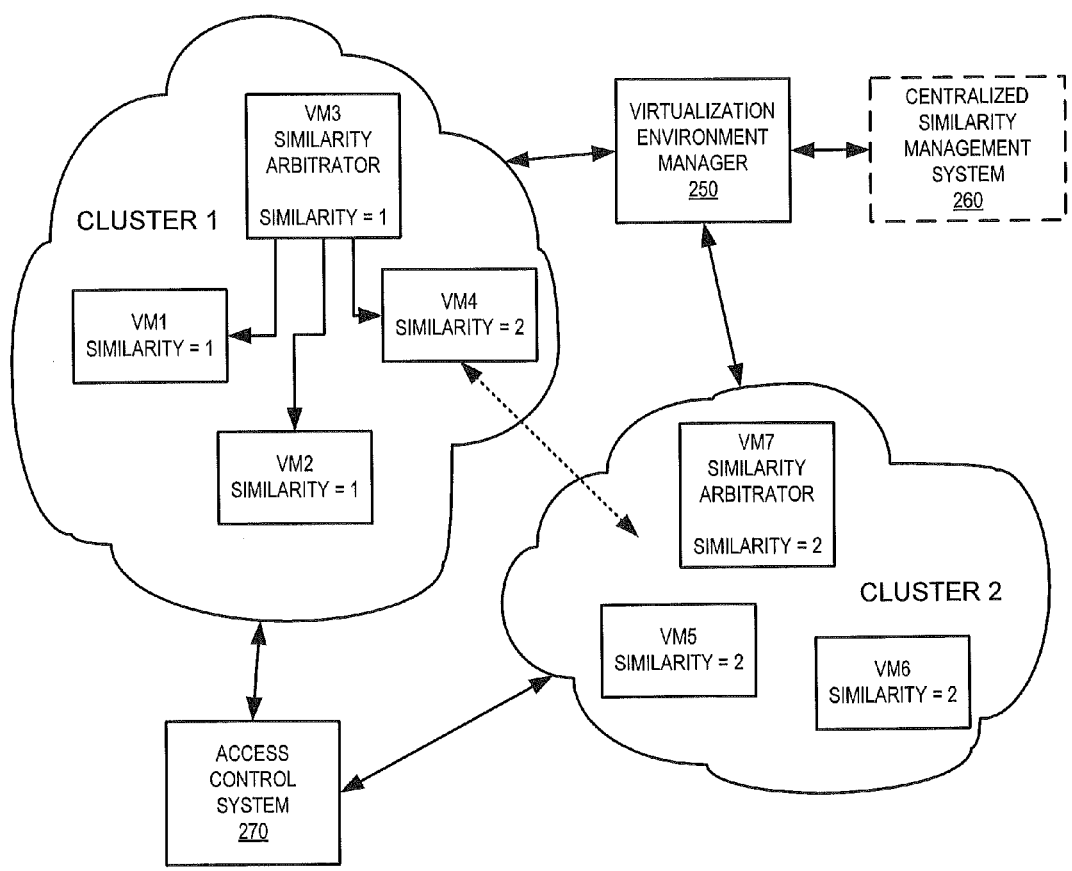
FIG. 3 illustrates clustering of virtual machines in a virtual operating environment according to some embodiments.

FIG. 3 illustrates a logical grouping of virtual machines VM1 to VM7 into two clusters, Cluster 1 and Cluster 2. Virtual machines can be grouped into logical clusters for management and/or operational purposes. For example, virtual machines can be grouped into clusters based on load balancing needs, security needs, redundancy needs, or any other needs as determined by a system administrator. The virtual machines grouped within a cluster may or may not all be implemented on a single physical server. Although two clusters are illustrated in FIG. 3, any desired number of clusters can be defined subject to system limitations, and each of the clusters can include any desired number of virtual machines subject to server limitations.

Virtual machines can be deployed in particular virtualization environments and organized to increase the efficiency of operating and/or managing a virtual computing environment. For example, virtual machines may be grouped into clusters in order to provide load balancing across multiple servers.

Virtual machines within a same cluster can be managed by a single virtualization environment manager 250 to have same or similar resource access privileges (e.g., processor utilization, priority, memory allocation, communication interface access privileges, etc.), while virtual machines within different clusters can have different resource access privileges.

Virtual machines that are deployed within a single cluster may share physical resources within a server 100. For example, virtual machines that are deployed within a single cluster may share physical memory, storage, communication facilities and other resources or services of a server 100. Whenever computing resources are shared, there is the possibility that one virtual machine could intentionally or unintentionally gain access to data of another virtual machine.

In the example illustrated in FIG. 3, the virtual machines VM1 to VM7 are grouped into clusters based on similarity of codified security policies. Clustered virtual machines may or may not be hosted together on the same server 100. However, virtual machines in a cluster may be managed as a group by a single virtualization environment manager 250 and/or a single access control system 270. As such, there may be some direct or indirect communication between the virtual machines in a cluster and/or the virtual machines in a cluster may share some common resources, such as communication or storage resources.

Cluster 1 includes virtual machines with security policies similar to a security policy defined as security policy 1, while and cluster 2 includes virtual machines with security policies that are close to security policy 2.

Each of the clusters includes a virtual machine that is designated as a similarity arbitrator. In cluster 1, VM3 is the similarity arbitrator, while in cluster 2, VM7 is the similarity arbitrator. The similarity arbitrator virtual machines can be dedicated to the task of similarity arbitration and/or can have additional functions.

In the example illustrated in FIG. 3, it is assumed that VM4 has changed its similarity level to 2, or has just been provisioned or moved into Cluster 1. The virtual machines in cluster 1 negotiate with VM3 (as the similarity arbitrator in the cluster). Based on the negotiation, VM3 may decide that since VM4 has a similarity of 2 it should be moved to Cluster 2. VM3, the similarity arbitrator, then contacts all the relevant parties (such as the virtualization environment manager 250 and the proposed/changed virtual machine) to effectuate the change.

This system may rapidly detect when a dynamic change in a security policy creates a potential risk in security compliance. In particular, in a cluster of virtual machines, systems/methods according to some embodiments enable a similarity arbitrator to compare the similarity of security policies among virtual machines in the cluster, and to reject the addition of less similar virtual machines (foreigners) proposed to be added to the cluster. Some embodiments may also evaluate the similarity of security policies of members of a cluster in response to a change in the security policy of one of the members.

When a virtual machine is proposed to be added to the cluster, a message is sent from the virtualization environment manager 250 to the similarity arbitrator in the cluster identifying the virtual machine that is proposed to be added to the cluster. The proposed cluster member and the similarity arbitrator then engage in a comparison/negotiation phase to determine if the proposed virtual machine is suitable for inclusion in the cluster. The comparison/negotiation may take place solely between the proposed cluster member and the similarity arbitrator or may take place among all current members of the cluster under the guidance and control of the similarity arbitrator.

Similarly, when the security policy of a virtual machine in a cluster changes, a message may be sent from the virtual machine to the similarity arbitrator, at which point the changed cluster member and the similarity arbitrator engage in a comparison/negotiation phase to determine if the changed virtual machine should remain in the cluster. The comparison/negotiation may take place solely between the similarity arbitrator and the changed virtual machine, or may take place among all current members of the cluster under the guidance and control of the similarity arbitrator.

In embodiments in which all of the virtual machines in a cluster participate in the comparison/negotiation phase, the virtual machines in the cluster may rank their similarity to other members of the cluster. From this ranking, the similarity arbitrator may determine the least similar virtual machine among all virtual machines in the cluster and the proposed member. The similarity arbitrator may determine a distance in a predefined similarity space of the least similar virtual machine from, for example, the average of all virtual machines in the cluster and/or the distance from the next least similar virtual machine in the cluster. This distance may be calculated, for example, using a similarity algorithm that defines a numerical similarity between virtual machines. In response, the group and/or the similarity arbitrator decides if virtual machine proposed to be added to the group, or the changed virtual machine, should be moved out of the cluster, or is similar enough to remain in the cluster/segmented network/logical group. If the proposed/changed virtual machine is rejected from the joining the cluster, a message may be sent from the similarity arbitrator to the virtualization environment manager 250 informing the virtualization environment manager 250 of the decision not to allow the proposed virtual machine to join the cluster or to remove the changed virtual machine from the cluster. The message may also indicate the reason for the rejection.

In some embodiments, this comparison/negotiation phase may be performed before a proposed virtual machine is moved into the cluster. In other embodiments, the new virtual machine is moved into the cluster by the virtualization environment manager, and the comparison/negotiation takes place after the virtual machine has been moved into the cluster.

If a virtual machine is rejected from joining the cluster, an optional similarity management system 260 may be requested to verify the correctness of this assumption, and potentially move the virtual machine out of the cluster (for example, using a delegated request to an automation tool). The similarity system may confirm the decision, or decide to override the decision and keep the proposed virtual machine in the cluster.

In embodiments in which there is no centralized similarity management system 260, a locally appointed agent in the peer group of virtual machines in the cluster can inform an automation/provisioning tool in the virtualization provider of a needed change, and/or inform a centralized Access Control System 270 of a potential security risk/hazard (alert).

Figure 4:
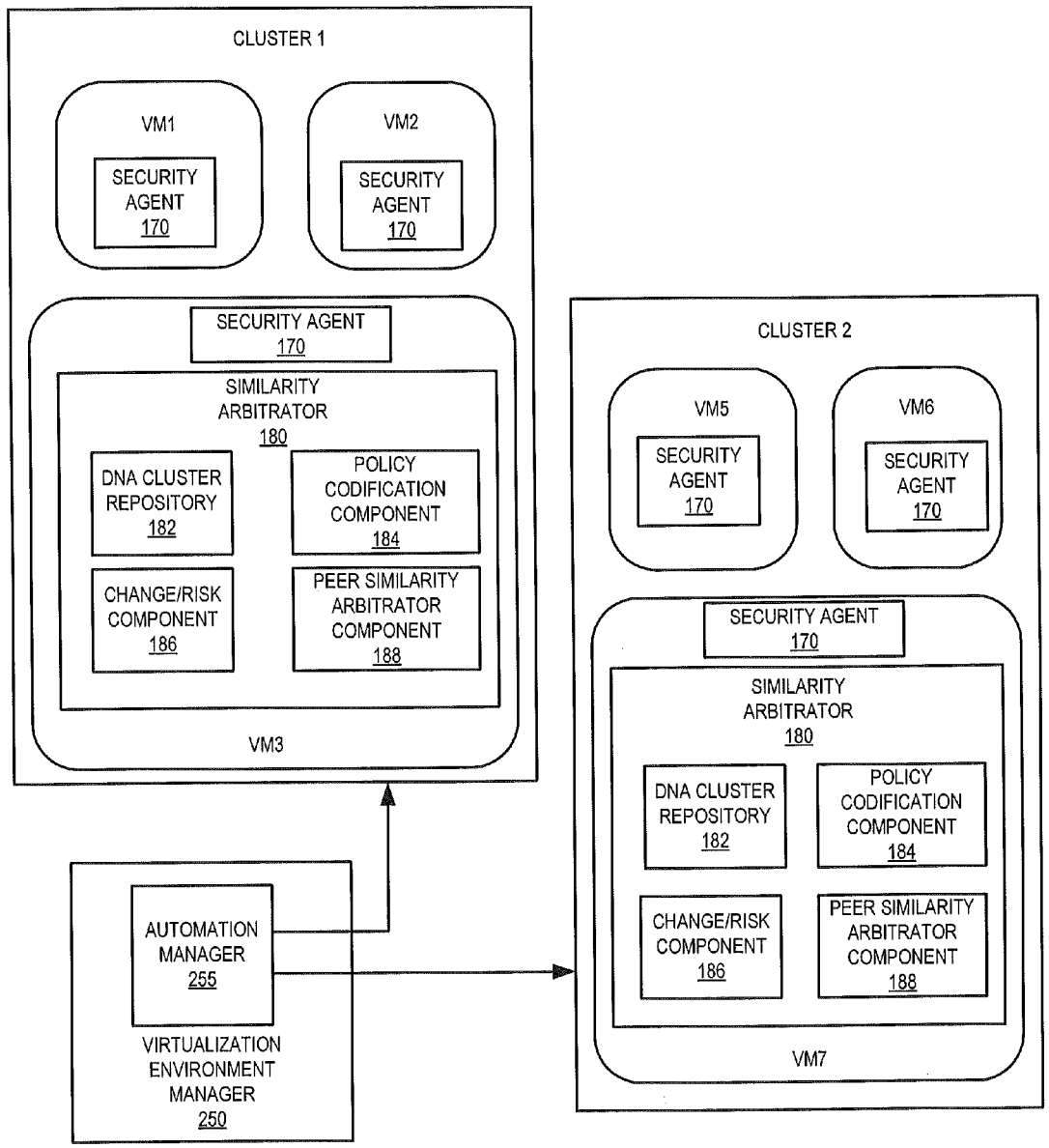
FIG. 4 illustrates aspects of virtual machines in a virtual operating environment according to some embodiments.

FIG. 4 illustrates various components associated with virtual machines in a cluster in more detail. As shown therein, each virtual machine includes a security agent 170 that is configured to maintain and enforce security policies of the virtual machine.

The virtual machine that serves as the similarity arbitrator of a cluster further includes a similarity arbitrator module 180 having a number of components. For example, the similarity arbitrator module 180 may include a DNA cluster repository 182, a policy codification component 184, a change and risk component 186 and a peer similarity arbitrator component 188.

It will be appreciated that the functionality of the similarity arbitrator module can be distributed across multiple virtual machines in the cluster. For example, although illustrated in FIG. 4 as residing in a single virtual machine in a given cluster, the DNA cluster repository 182, policy codification component 184, change and risk component 186 and peer similarity arbitrator component 188 may be implemented in other virtual machines within the cluster.

Each policy in a virtual machine that can be changed is managed via a policy codification component 184, either for groups or for a single server (sporadic changes). Each time a policy is modified, the policy codification component 184 re-codifies the policy, creating a security policy DNA as described above, or in any other codification manner. Each codified DNA is associated with a specific virtual machine.

The DNA cluster repository 182 maintains a list of all codified DNA and a list of virtual machines as groups that are either created by people (manual grouping), or created by optimization tools.

The Peer Similarity Arbitrator Component 188 is invoked in response to a change in a DNA of any virtual machine in the cluster. This component receives references or a list of the peer virtual machines within the cluster and their associated codified DNA that belong to the same cluster as the changed virtual machine. The Peer Similarity Arbitrator Component 188 then initiates a "balancing match making" comparison to rank similarity between DNA, similar to the optimization method of finding partners matching, or Least Mean Square (LMS), or any other matching algorithm. After ranking all possible matching and rating for each virtual machine, this component selects the most distant (lowest rank) virtual machine from most of the existing agents. The distance and number of agents needed for majority vote are parameters defining the system sensitivity. These parameters can be set for each cluster separately, having non-uniform levels of sensitivity for different clusters.

The Change and Risk Component 186 controls how the virtual machine responds to a potential security risk. Upon detection of a foreign or undesired virtual machine from within the associated cluster, the Change and Risk component 186 decides when and how to invoke the delegating action components, such an automation manager 255 in the virtualization environment manager 250, to request a migration of the identified virtual machine to another cluster, the Access Control Security alert system 270, and/or a global clustering optimization system (not shown).

Figure 5:
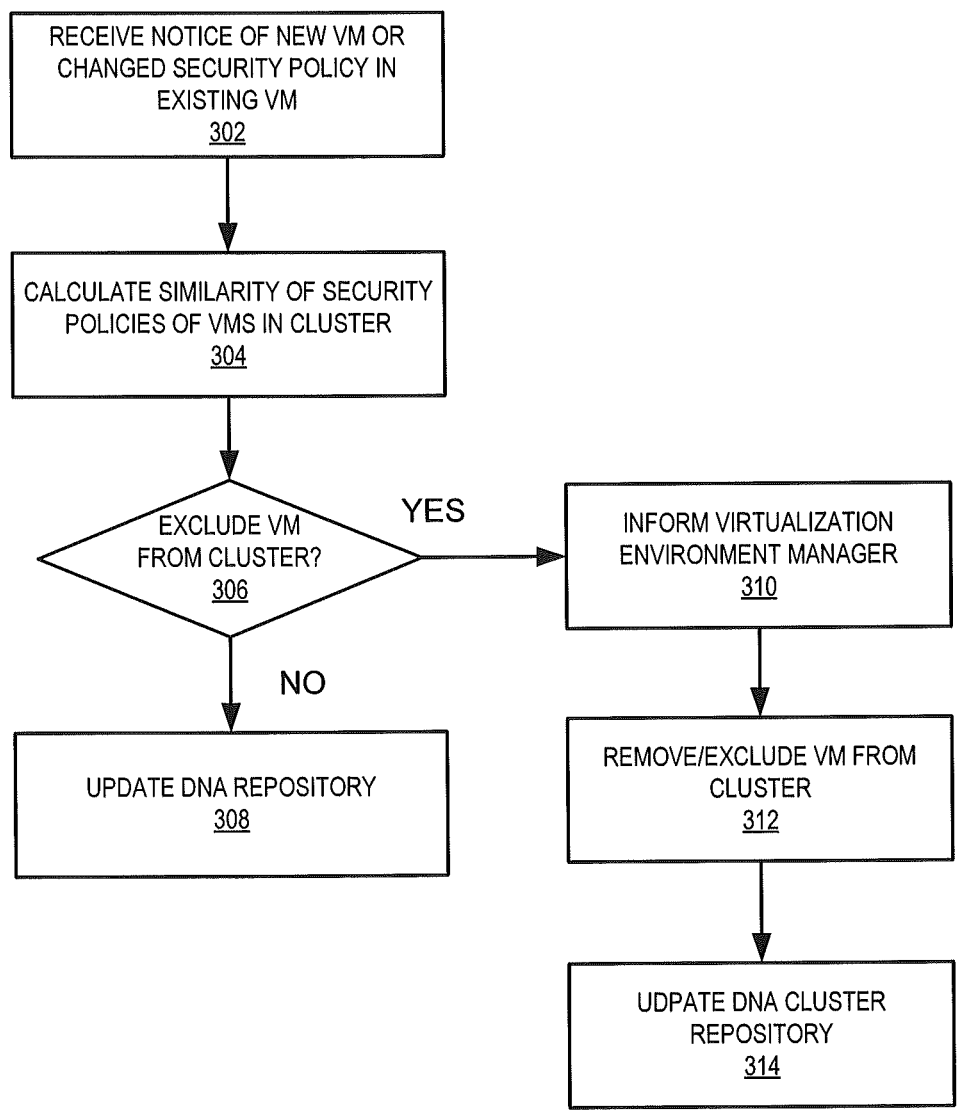
FIG. 5 is a flowchart illustrating systems/methods according to some embodiments.

FIG. 5 is a flowchart illustrating operations of systems/methods according to some embodiments. Referring to FIGS. 4 and 5, a similarity arbitrator 180 operating in a virtual machine of a cluster receives notification of a new virtual machine proposed to be added to the cluster or of a change in the security policy of a virtual machine that is already a member of the cluster (block 302). The similarity arbitrator 180 then engages in a comparison/negotiation phase with the proposed/changed virtual machine in which the similarity arbitrator 180 calculates a metric representative of a difference in the security policies of each of the members of the cluster and the proposed/changed virtual machine (block 304).

In response to determining the difference in security policies, the similarity arbitrator 180 makes a determination about whether the proposed/changed virtual machine should be excluded from the cluster (block 306). For example the similarity arbitrator 180 could use a rule for this determination that any virtual machine whose security policy metric is different from an average security policy metric of the other virtual machines in the cluster by more than a predetermined threshold value should be excluded from the group. In another example, the similarity arbitrator 180 could use a rule for this determination that any virtual machine whose security policy metric is different from the security policy metric of any other virtual machine in the cluster by more than a predetermined threshold value should be excluded from the group. Other rules are possible, and the present inventive concepts are not limited to the particular rule employed.

Referring still to FIG. 5, if the similarity arbitrator 180 determines that the proposed/changed virtual machine should not be excluded from the cluster, the similarity arbitrator 180 may update the DNA repository 182 to reflect the inclusion of the changed/proposed virtual machine (block 308). If however the similarity arbitrator 180 determines that the changed/proposed virtual machine should not be included in the cluster, the similarity arbitrator 180 may send a message to the virtualization environment manager 250 requesting that the proposed/changed virtual machine should be excluded or removed from the cluster (block 310). In response to the consequent removal/exclusion of the proposed/changed virtual machine by the virtualization environment manager 250 (block 312), the similarity arbitrator 180 may then update the DNA repository 182 accordingly (block 314).

Systems/methods according to some embodiments may enable a rapid response to changed security conditions triggered by a changed policy (modified policy), and/or insertion of a new agent into a cluster with a new policy. Immediately, when the change is conducted, the system may generate alerts on violations of similarity and suggest a potential risk, which may trigger a remedy action.

Such changes may be rapid and nimble, and may not involve overall balancing of all the resources in the managed environment. Rather, the systems/methods may maintain the "ripple" effect of the change within the cluster, and only escalate the need for action if the risk is high (according to predetermined criteria).

As such, the systems/methods disclosed herein may be highly scalable, adaptive, and/or may maintain levels of autonomous control over decision-making, separating human involvement and normal changes.

Systems/methods according to some embodiments can provide local threshold alerts for attacks. This may help to maintain an efficient, scoped, decision making process regarding potential risks faced by a cloud computing provider.

Systems/methods according to some embodiments can also provide a cascading alert according to different risks levels in different areas/network clusters. Highly secured virtual machines may quickly notify a centralized function of a minor risk, such as lack of similarity of security policies, and request that action be taken to mitigate the risk, even over minute changes in similarity. Less secured virtual machines can alert the centralized function to security risks that are more distinct. Thus, gradual, relative risk management may be provided by these systems/methods provided over different environments and risk types.

The systems/methods described herein can be active even in the absence of a centralized optimization risk assessment system, by only alerting the virtualization manager of potential risks, without triggering any "modification" actions on the part of the virtualization manager.

The modular design of these systems/methods may enable a system designer to add these risk management features in dedicated segments and not across an entire environment according to the needs of the system. The systems/methods disclosed herein may not have any substantial impact on deployed agents and may not substantially slow or hamper performance, as the systems/methods described herein may not be used as an ongoing monitoring system in some embodiments, but rather may provide interception of potential risks as part of a change to the cloud system in which they are deployed.

Accordingly, by using systems/methods described herein, a system designer can combine capacity and change management of deployed systems, with security levels restrictions as part of the location (segment/cluster) decision making, both before and after initial deployment. The reaction of the system to the change is pushed down from a centralized location to a distributed, cluster level. Thus, the system can react in near real time to changes in cluster assignment that raise a potential security risk. Moreover, these systems/methods may be highly scalable.

The net effect of these systems/methods is to increase the security of virtual machines in a virtual computing environment, as it reduces the risk that virtual machines in a cluster will have substantially different security requirements.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method comprising:
    receiving at a similarity arbitrator data about a security policy of a candidate virtual machine that is proposed to be included in a cluster of virtual machines or excluded from the cluster of virtual machines,
    comparing the security policy of the candidate virtual machine to security policies of a plurality of virtual machines in the cluster of virtual machines, and
    in response to comparing the security policy of the candidate virtual machine to the security policies of the plurality of virtual machines in the cluster, generating a recommendation for a virtualization environment manager to include the candidate virtual machine in the cluster or exclude the candidate virtual machine from the cluster.

2. The method of claim 1, further comprising codifying the security policy of the candidate virtual machine to form a codified security policy, wherein comparing the security policy of the candidate virtual machine to the security policies of the plurality of virtual machines in the cluster comprises comparing the codified security policy of the candidate virtual machine with codified security policies of the plurality of virtual machines in the cluster.

3. The method of claim 1, wherein the candidate virtual machine comprises a virtual machine that is analyzed for generating a recommendation for adding to the cluster.

4. The method of claim 1, wherein generating the recommendation that the candidate virtual machine be excluded from the cluster or included in the cluster is performed in response to a change in the security policy of the candidate virtual machine.

5. The method of claim 1, wherein comparing the security policy of the candidate virtual machine to the security policies of the plurality of virtual machines in the cluster comprises generating a metric that compares the security policy of the candidate virtual machine to the security policies of the plurality of virtual machines in the cluster.

6. The method of claim 5, further comprising sending a message to the virtualization environment manager instructing the virtualization environment manager to exclude the candidate virtual machine from the cluster in response to a determination that the security policy of the candidate virtual machine differs from the security policies of the plurality of virtual machines in the cluster by an average amount that is greater than a predefined threshold amount.

7. The method of claim 5, further comprising sending a message to the virtualization environment manager instructing the virtualization environment manager to exclude the candidate virtual machine from the cluster in response a determination that the security policy of the candidate virtual machine differs from the security policy of any of the plurality of virtual machines in the cluster by an amount that is greater than a predefined threshold amount.

8. The method of claim 5, wherein the metric indicates a difference between a first security policy and a second security policy based on at least one of (i) a number of identical entries in the first and second security policies (ii) a difference in sizes of the first and second security policies, and (iii) a difference in order of appearance of entries in the first and second security policies.

9. The method of claim 2, wherein codifying the security policy comprises substituting symbols for semantic terms in the security policy.

10. A computer program product for operating a virtual computing system including a plurality of virtual machines that are logically arranged in a cluster that is managed by a virtualization environment manager, one or more of the virtual machines in the cluster comprising a similarity arbitrator, the computer program product comprising:
a non-transitory computer readable storage medium having computer readable program code embodied in the medium, the computer readable program code comprising:
computer readable program code configured to receive, at the similarity arbitrator, data about a security policy of a candidate virtual machine that is proposed to be included in the cluster or excluded from the cluster,
computer readable program code configured to perform a comparison of the security policy of the candidate virtual machine to security policies of a plurality of virtual machines in the cluster, and
computer readable program code configured to generate a recommendation that the virtualization environment manager include the candidate virtual machine in the cluster or exclude the candidate virtual machine from the cluster in response to the comparison of the security policy of the candidate virtual machine to the security policies of the plurality of virtual machines in the cluster.

11. The computer program product of claim 10, further comprising computer readable program code configured to codify the security policy of the candidate virtual machine to generate a codified security policy, and the similarity arbitrator is configured to compare the codified security policy to codified security policies of the plurality of virtual machines in the cluster.

12. The computer program product of claim 10, further comprising computer readable program code configured to generate the recommendation for excluding the candidate virtual machine from the cluster or including the candidate virtual machine in the cluster in response to a change in the security policy of the candidate virtual machine.

13. The computer program product of claim 10, further comprising computer readable program code configured to generate a metric from the comparison of the security policy of the candidate virtual machine to the security policies of the plurality of virtual machines in the cluster, and to use the metric to generate the recommendation for excluding the candidate virtual machine from the cluster or including the candidate virtual machine in the cluster.

14. The computer program product of claim 13, further comprising computer readable program code configured to generate the recommendation for excluding the candidate virtual machine from the cluster or including the candidate virtual machine in the cluster in response to a determination that the security policy of the candidate virtual machine differs from the security policies of the plurality of virtual machines in the cluster by an average amount that is greater than a predefined threshold amount.

15. The computer program product of claim 13, further comprising computer readable program code configured to recommend excluding the candidate virtual machine from the cluster in response to a determination that the security policy of the candidate virtual machine differs from the security policy of any of the plurality of virtual machines in the cluster by an amount that is greater than a predefined threshold amount.

16. The computer program product of claim 13, wherein the metric indicates a difference between a first security policy and a second security policy based on at least one of (i) a number of identical entries in the first and second security policies, (ii) a difference in sizes of the first and second security policies, and (iii) a difference in order of appearance of entries in the first and second security policies.

* * * * *